P. T. SPINDLER.
STREET AND STATION INDICATOR.
APPLICATION FILED FEB. 14, 1910.

1,006,141.

Patented Oct. 17, 1911.

5 SHEETS—SHEET 1.

P. T. SPINDLER.
STREET AND STATION INDICATOR.
APPLICATION FILED FEB. 14, 1910.

1,006,141.

Patented Oct. 17, 1911.
5 SHEETS—SHEET 2.

P. T. SPINDLER.
STREET AND STATION INDICATOR.
APPLICATION FILED FEB. 14, 1910.
1,006,141.
Patented Oct. 17, 1911.
5 SHEETS—SHEET 3.
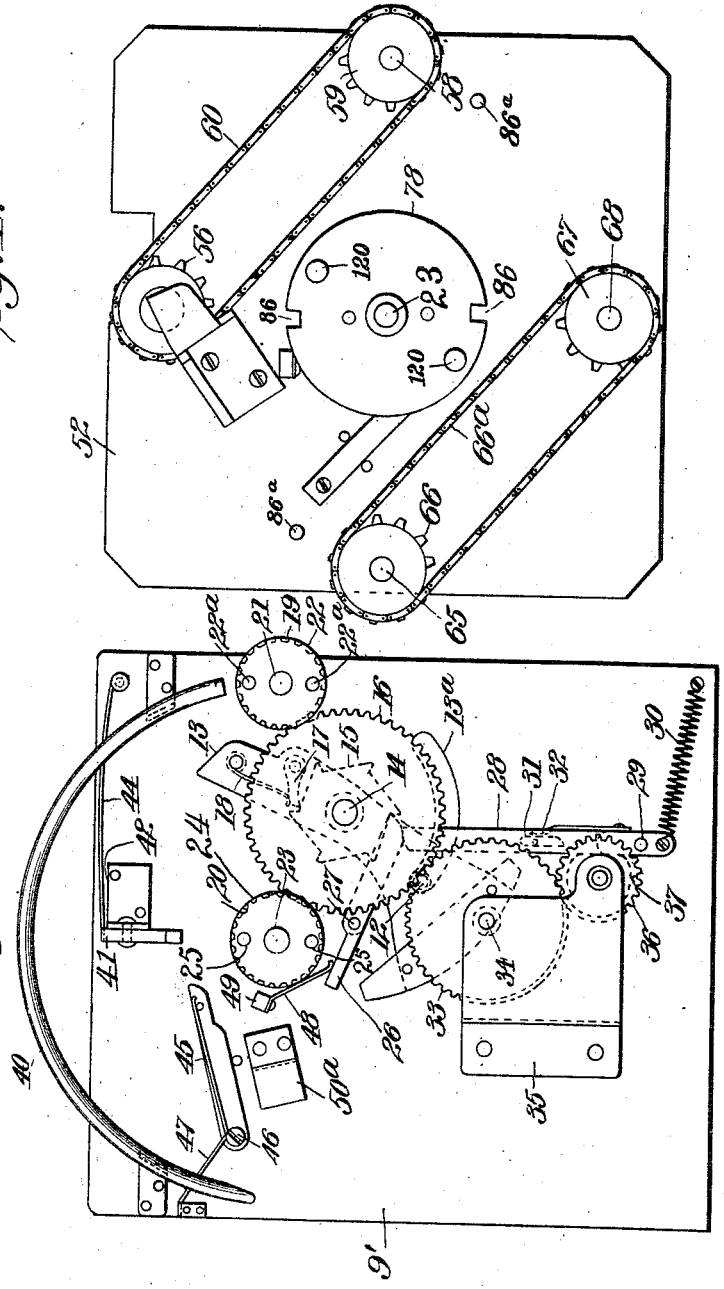

P. T. SPINDLER.
STREET AND STATION INDICATOR.
APPLICATION FILED FEB. 14, 1910.
1,006,141.
Patented Oct. 17, 1911.
5 SHEETS—SHEET 4.
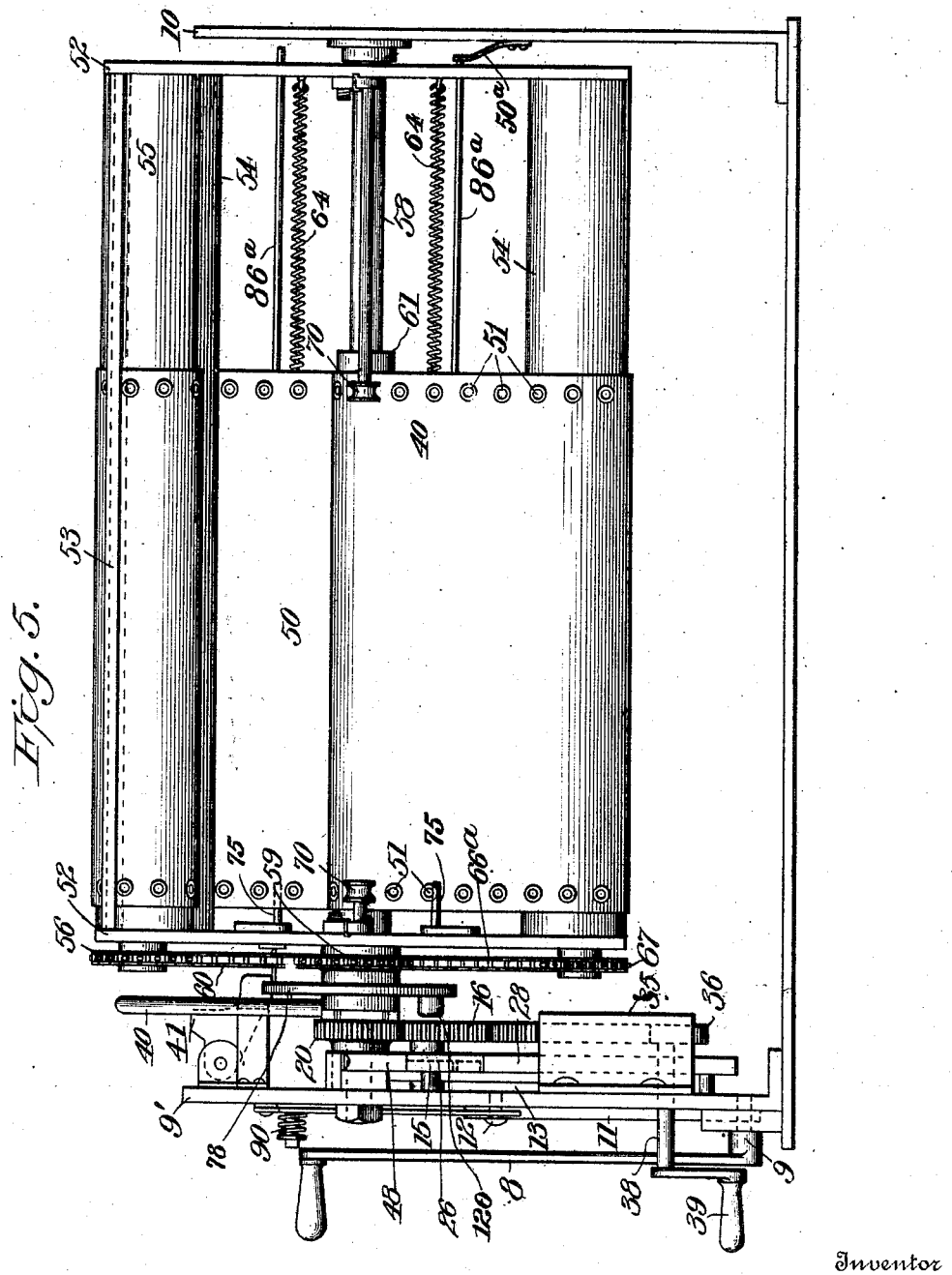

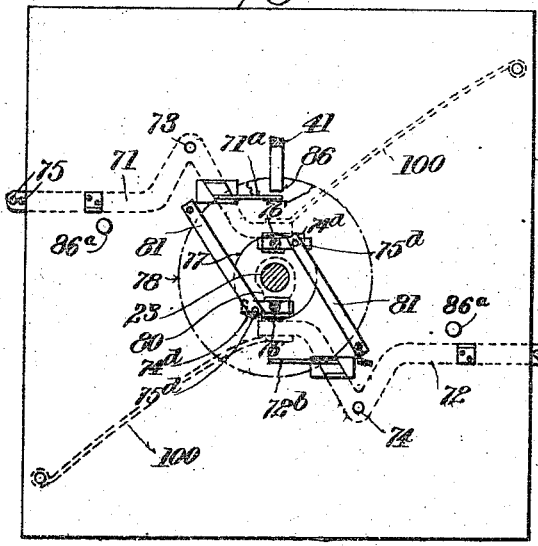
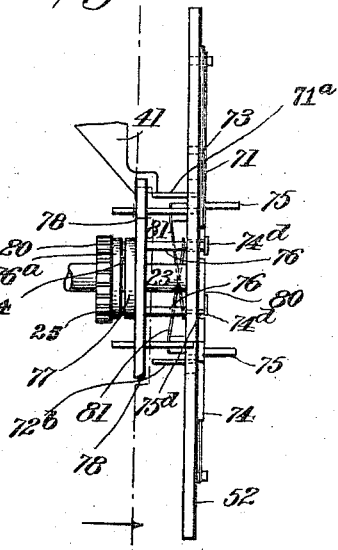
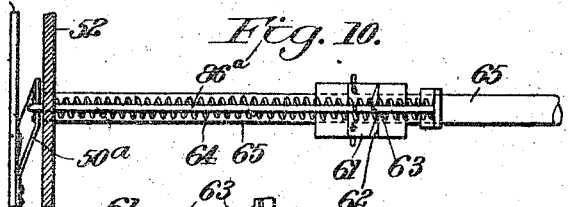
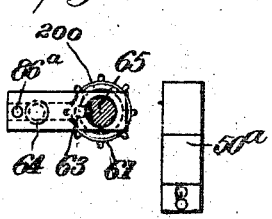
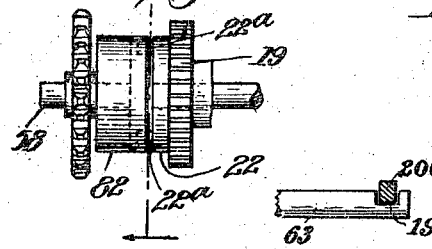
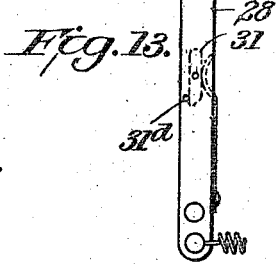

UNITED STATES PATENT OFFICE.

PERRY T. SPINDLER, OF CHICAGO, ILLINOIS, ASSIGNOR TO AMERICAN STREET AND STATION INDICATOR COMPANY, OF CHICAGO, ILLINOIS, A PARTNERSHIP.

STREET AND STATION INDICATOR.

1,006,141.  Specification of Letters Patent. Patented Oct. 17, 1911.

Application filed February 14, 1910. Serial No. 543,674.

*To all whom it may concern:*

Be it known that I, PERRY T. SPINDLER, citizen of the United States, residing at Chicago, in the county of Cook and State of Illinois, have invented certain new and useful Improvements in Street and Station Indicators, of which the following is a specification.

This invention relates to street or station indicators of the double reel and web type, and has for its object to provide improved means for supporting and operating the web which bears the names of the streets or stations.

The take-up may be operated by hand, as hereinafter shown and described, or other devices may be used for the purpose of actuating the same.

The invention embodies a casing, in which is mounted a frame carrying the web and the reels for the same, and this frame as a whole may be turned or reversed at the end of the line, or elsewhere if desired, for the purpose of reversing the web for the return trip. The take-up mechanism is engageable with the reel devices in either position. Improved means are also provided for relieving the tension on the web incident to the increase in diameter of the reels on which it is wound.

The invention is illustrated in the accompanying drawings in which—

Figure 1:
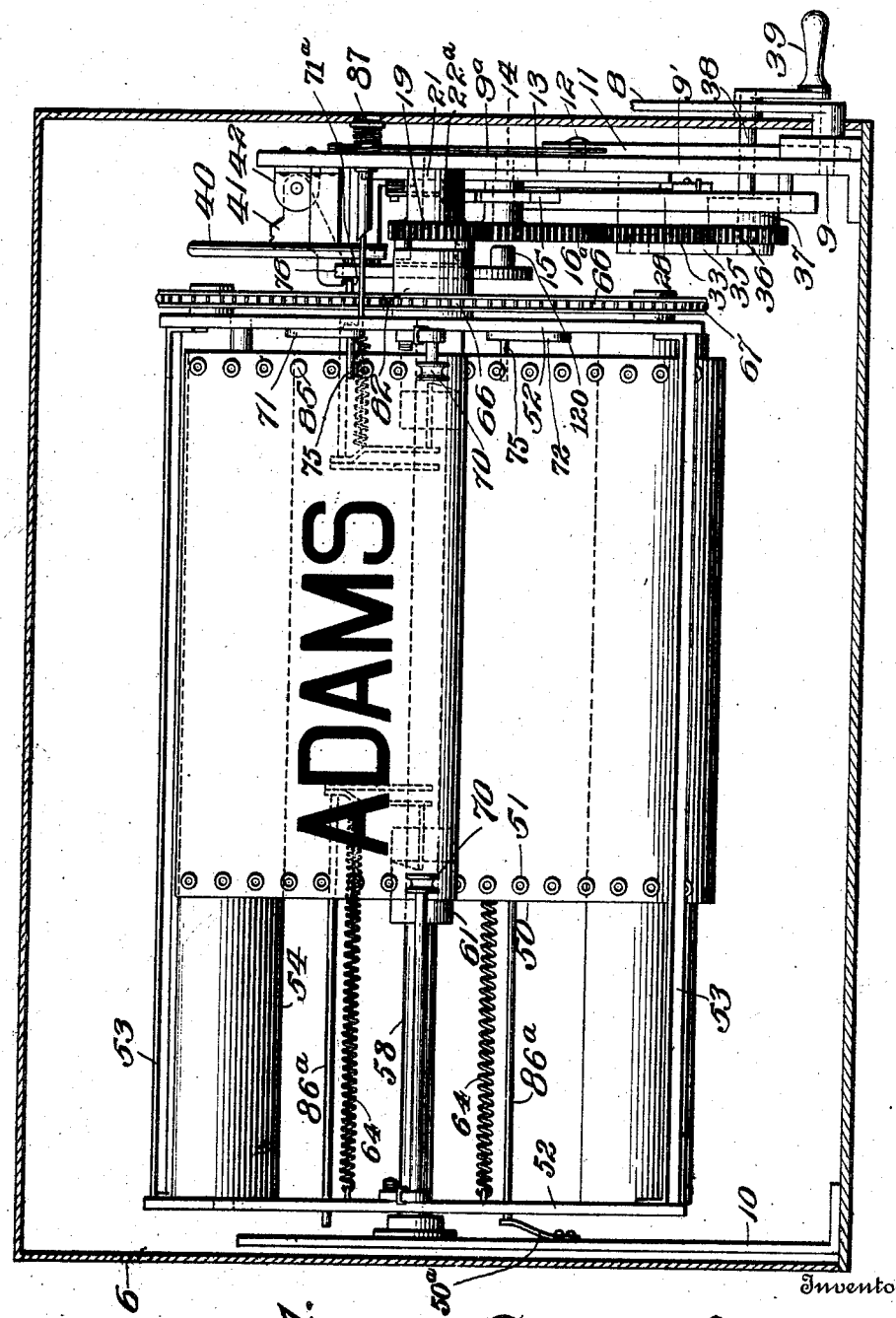
Figure 2:
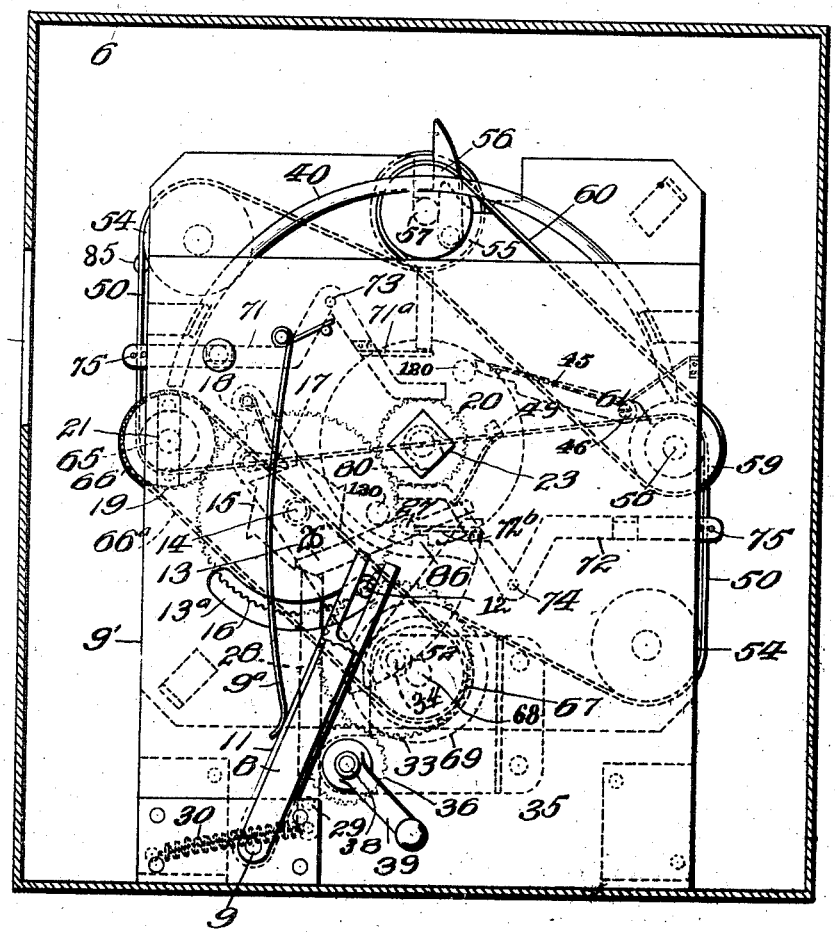

Figure 1 is a front elevation of the device with a portion of the outer casing removed. Fig. 2 is an end elevation, the casing being broken away. Fig. 3 is an elevation of part of the take up devices, supported by a fixed end plate, said devices being engaged with the reel mechanism to take up the web, and to turn the reel frame at the end of the line. Fig. 4 is an end elevation of the reel frame and parts associated therewith, removed from the supporting frames. Fig. 5 is a rear elevation of the machine, the casing being removed. Figs. 6 and 7 are side and end elevations of the clutch release mechanism for reversing the web. Figs. 8 and 9 are details in side and end view of a clutch at the end of one of the reel shafts. Figs. 10, 11 and 12 are details in side and end view of web feeding devices. Fig. 13 is a detail of a locking bar. Figs. 14 and 15 are sectional details of parts shown in Fig. 11.

Referring specifically to the drawings, 6 indicates an outer casing which contains the mechanism, provided with an opening 7 through which the street or station names on the web may be seen.

The mechanism is illustrated as operated by a lever 8 secured to a rock shaft 9 which extends through the end of the casing 6. The operative parts of the mechanism, as well as the rotating reel frame, are supported by two end plates 9' and 10. The rock shaft 9 carries a slotted lever 11, located between the plate 9' and the end of the casing, and a spring 9ª bears against this lever to return it after each operation. The slotted end of said lever receives a pin 12 which extends through a segmental slot 13ª in the end plate 9', said pin 12 being secured to a swinging member 13 pivoted to a stud 14 supported by the end plate 9'. The same stud carries a ratchet 15 and a spur gear 16 loose thereon. A pawl 17 is pivoted to the member 13 near its upper end and is pressed to engagement with the ratchet 15 by a spring 18.

The spur gear 16 engages with spur pinions 19 and 20. The former is rotatably mounted on a stud 21 and is integral with a disk 22 which is provided with two short pins 22ª projecting from the side thereof toward the reel frame. The pinion 20 is rotatably mounted on a main stud or pivot rod 23, which also forms the axis about which the reel frame may be turned to be reversed. The pinion 20 is integral with a disk 24, provided with holes 25. It may be here stated that the disk 22 and its pins 22ª form one member of a clutch which operates the take up of the web, and the disk 24, with its holes 25, form one member of a clutch which revolves the reel frame half a revolution, at the end of the line, or when the web is to be reversed.

Returning to the ratchet wheel 15, a dog 26, pivoted on stud 27, is used to lock said ratchet and prevent back slip thereof. The dog is pressed by a spring 48 fastened to a support 49. A locking bar 28 is pivoted on stud 29 on the side plate 9', and is used for locking the dog 26 in engagement with the ratchet, being normally held in locking position, as shown in Fig. 3, by a spring 30. A small dog 31 is pivoted to the locking bar 28 and is provided with a spring 32, and its upper end is located in the path of the lower cam edge of the swinging member 13.

A spur gear 33 also engages with the gear 16, and is mounted on a stud 34 supported by a bracket 35 and the end plate 9'. A pinion 36 meshes with the gear 33, and is integral with a cam 37 both of which are attached to a shaft 38 which is provided with a crank 39 at its outer end.

A guide rod 40 is supported by the end piece 9'. A locking piece 41 is pivoted to a bracket 42 on the end plate 9' and is provided with a spring 44 to hold its free end in engagement in a notch in a circular piece 78 which turns with the reel frame as hereinafter described, the notches being indicated at 86 and located at diametrically opposite points on the periphery of said plate.

45 is a bumper pivotally mounted on a stud 46, and pressed by a spring 47 and its function is to retard or oppose the momentum of the reel by the tension of spring 47 when the pins 120 on disk 78 come in contact with the bumper just prior to the completion of the semi-revolution of the reel.

The web on which the names of streets or other matter appears at regular intervals is indicated at 50, and it is provided at its side edges with eyelets 51 which are set in the web at equal distances apart. The revolving reel frame comprises two end plates 52 separated by braces 53 and mounted on the main axis 23. These end plates carry two idler rollers 54, a reel 55 and a reel 69, arranged respectively at diametrically opposite points. The reel 55 is shown at the upper position and the reel 69 at the lower position, and these positions are reversed when the reel frame is turned half way around for the return trip.

The reel 55 is mounted on a shaft 57 which carries a sprocket 56 frictionally mounted thereon. The shaft bearings are operable so that the reel may be removed when desired. A web-feed shaft 58 has bearings in the end plates 52 and at one end has a sprocket belted to the sprocket 56 by a chain 60. The shaft 58 carries two pin sprockets 61 the pins of which engage in the eyelets 51 of the web. These pin sprockets 61 are loose on the shaft, but are clutched thereto by means of sliding pins 63 carried by collars 62 fast on the shaft. The pins 63 engage the jawed ends of the sprockets 61, and are pressed to engagement by spring 64 so as to cause the same to revolve with the shaft. These parts are duplicated on a shaft 65 which is located diametrically opposite the shaft 58, the shaft 65 being similarly mounted between the end plates 52. This shaft 65 carries a frictionally mounted sprocket 66 belted by a chain 66ª to sprocket wheel 67 on shaft 68 of the lower reel 69. The shaft 58 carries a cylindrical clutch member 82 which has in its end a diametric slot into which the pins 22ª of the disk 22 project, and, similarly, the shaft 65 carries a slotted clutch piece 82, which may be engaged with said pins. When the reel frame is turned the slots follow the guide rod 40 and are guided thereby onto the pins 22ª to clutch either shaft to said pins and thus to the take up devices operated by the lever 8 as heretofore described.

Small guide rollers 70 are located on the outside of the web and serve to assist in keeping the pin teeth of the sprockets engaged with the eyelets in the web.

Two levers 71 and 72, identical in construction, are pivoted at 73 and 74 respectively and are pressed by springs 100, and each carries two small rollers indicated at 75 at the outer ends of said levers. These rollers serve to guide the web and also act to release the reel frame before it is reversed, as hereinafter described. The levers have projections 71ª and 72ᵇ which act to lift and release the lock 41 from the notch 86 in the circular plate 78. The inner ends of the levers project into position between pieces 74ᵈ and the end plate 52. Said pieces 74ᵈ are provided with lugs 75ᵈ secured to the ends of flat springs 81 respectively on the inner side of the end plate 52. The pieces 74ᵈ are provided with pins 76 which extend through holes in the end piece 52 into the hub 77 of the circular plate 78, and the ends of the pins 76 are normally flush with the outer side or face of the hub of the circular plate 78 and in position to be advanced when the lever 71 or 72 is tripped, into a hole 25 in the circular hub or piece 24, by means of the appropriate spring 81, to clutch the reel frame and the piece 24 which is carried as stated by the gear 20. The main stud 23 is provided with a cam 80 for retracting the pins 76 from the holes 25 in the disk 24, to release the clutch.

As previously stated the reel frame is free to turn on its axis with bearings in the end plates 9' and 10 respectively, at desired times, by the mechanism described.

The operation is as follows: Assuming that the web is wound on the upper reel 55 and is to be unwound therefrom, said web passes over the top idler 54 and thence downwardly and is engaged by the pins of the pin sprockets 61 on the shaft 65. Thence it passes backwardly across and around the pin sprockets 61 on the shaft 58, from which it passes under the lower idler 54 and then to the reel 69 to which its end is fastened by any suitable means. In unrolling the curtain from the reel 55 and taking it up on the reel 69, the lever 8 is pulled forwardly, turning the rock shaft 9 and swinging the slotted lever 11, which causes the pivot 12 to follow the slot 13ª, which swings the member 13 on its pivot 14. As it swings, the lower cam edge of said lever strikes the small dog 31, movement of which, however, in said direction, is prevented by the pin 31ᵈ, and continued swinging of the part 13 turns the locking member 28 backwardly on its pivot 29 and unlocks the dog 26. During the same movement the pawl 17 has engaged a tooth on the ratchet 15 turning the same on the stud 14. The ratchet 15 and gear 16 are integral and the gear is thus turned one step of the ratchet. This rotates the pinions 19 and 20. The engagement of the pins 22ª, which turn with the pinion 19 and are engaged in the slot of the member 82 fast on the shaft 65 rotates said shaft, and the pin sprockets 61 thereon pull the curtain from the reel 55. The movement of the latter turns the sprocket 56 which by means of the chain 60 turns the sprocket 59, shaft 58 and pin sprockets 61 thereon, thereby producing a like movement of the latter and consequently of the web engaged thereby. This takes up the same length of web that has been unrolled from the reel 55. The sprocket 66 on shaft 65 being belted to the shaft 68 turns the latter and the reel 69 which thus winds up the web thereon as rapidly as it is unrolled from the reel 55. At the end of this movement the lever 8 is released and is returned to original position by its spring 9ª. The operation is repeated for each street to be indicated. It must be understood that the sprocket on the end of shaft 58 is an ordinary friction sprocket. The same is true regarding the sprocket on shaft 65. If power is supplied to the shaft 65, the roll 55, will be rotated at a constantly decreasing speed; hence the movement of roll 59 will continue to decrease, and will at all times take up the web for the reason that the sprockets referred to are frictional and that feature allows for all differences in speed.

When the last street has been indicated and the car is ready for the return trip, reverse movement of the curtain is necessary, and for this purpose the whole reel frame is given a half revolution, the reels 69 and 55, and the other parts, thus exchanging positions. A button 85 is provided on the web, at the end of the run, and after the last street is shown this button strikes the small rollers 75 on the lever 71, these rollers being too close together to permit the button to pass. The pull on the web therefore turns the lever 71 on its pivot 73, and the inner end of the lever lifts the locking member 41 from the notch 86 in the circular plate 78. Simultaneously the end of the lever 71 is lifted from in front of the piece 74ᵈ, and the action of the spring 81 forces the upper pin 76 through the hub 77 and the plate 78 until said pin enters the upper hole 25 in the clutch member 24, thereby engaging the clutch. As the operation of the lever 8 is continued the clutch thus formed transmits the motion of the gear 20 and the member 24 and turns the reel frame a half turn, bringing the shaft 58 around to front position, and the device is then ready for the return trip of the car. The lever 72 will then take the position formerly occupied by the lever 71 and in making said half turn the cam 80, which is fast on the stud 23 opens the space between the piece 74ᵈ and the end plate 52 which permits the inner end of the lever 72 to drop into position in front of said piece and disengage the clutch when the reverse movement of the web commences.

The pin sprockets 61 are so engaged by the spring rods 63 at their jawed ends as to cause the sprockets to revolve with the shaft. Each member 63 is connected to a rod 86¹ which is carried by and turns with the plate 52 (see Fig. 10) which also carries the shaft and the engagement of the sprockets 61 and members 63 is continuous while the web is being advanced, but said engagement is broken at the end of half of a revolution by the ends of the rods 86¹ coming in contact with a beveled cam 50ª, one of which is fastened to each of the end plates 9' and 10 which forces in said rod 86¹ and withdraws the pin 63 from the jawed end of the sprocket 61 and thereby disengages the same, leaving the sprockets 61 free to turn on their shaft, whereby the rear shaft (shown at 58 in Fig. 2) is free to permit the slip necessary to accommodate the increasing diameter of the web on the reel 69. The connection between the rod 86¹ to the pin 63, in such manner as to permit the shaft 65 and said pin to revolve irrespective of said rod, is effected by means of a ring 200 fastened to said rod and extending around the shaft, said ring engaging in a notch 199 (see Fig. 15) in the pin 63, thereby allowing the pin to revolve in the ring, but acting to slide the pin lengthwise when the rod 86¹ and ring 200 carried thereby are shifted.

In case a route is to be changed on either trip, a device for manually tripping the real frame is provided. This consists of a plunger 87 mounted on the end piece 9' and provided with a bevel end 89 and a suitable spring 90. The plunger may be pushed in to cause its bevel end to come in contact with a projection 91 on the lever 71 (or 72) thereby tripping the same and allowing the real frame to be revolved by movement of the lever 8.

To adjust the web in case of a change of route, without operation of the lever 8, the crank handle 39 may be turned. This has engagement with the shaft 38 which carries the pinion 36 which transmits motion through the gear 23 to the gear 16, and when this is operated the cam 37 on the shaft 38 strikes and unlocks the locking bar 28, to permit the parts to turn and thus take up the web.

Various changes may be made within the scope of the invention.

What I claim as new is:—

1. In a street or station indicator, the combination of a double reel and web, a revolving frame carrying the same, take up mechanism operatively connected to the web, means to revolve the frame to reverse the position of the reels, and locking mechanism acting to normally prevent said reversal, and means actuated by movement of the web to release said locking mechanism.

2. In a street or station indicator, the combination of a frame, a revolving frame therein, a double reel and web mounted upon said revolving frame, the axes of the reels and frame being parallel take up devices supported in part by each of said frames and including clutch members carried by the respective frames, means to turn the revolving frame a half turn to reverse the respective positions of the reels and web and to engage the respective clutch members in either position of the revolving frame.

3. In a street or station indicator, the combination of a revolving frame, double reels and a web mounted therein, a pair of web feeding shafts supported in the frame at opposite sides of its axis, means to revolve the frame a half turn to reverse the position of the web and said shaft, and take up mechanism engageable with either shaft to operate the same.

4. In a street or station indicator, the combination of a revoluble frame, reels mounted thereon on opposite sides of its axis, web-feeding shafts mounted therein on opposite sides of its axis, said shafts being geared to the reels, a web connected to the reels and extending around the shafts, means to turn the frame to reverse the relative positions of the reels and shafts, and means engageable with either of said shafts, when it is turned to a certain position, to operate the same.

5. In a street or station indicator, the combination of a revoluble frame, reels mounted therein, web-feeding shafts mounted therein on opposite sides of the axis of the frame, each shaft having a clutch member at the end thereof, take up mechanism including a clutch member engageable with either of said clutch members when the frame is turned to a certain position, and a guide along which each of said first mentioned clutch members travels, from disengaged to engaged position when the frame is revolved.

6. In a street or station indicator, the combination of a revoluble frame, a locking member engageable with the frame to hold the same in either of two positions, a double reel and web mounted in the frame, means to take up the web in either position of the frame, a tripping device engageable with said locking member to release the same, and means located at a predetermined point on the web to operate the tripping device, to permit the turning of the frame.

7. In a street or station indicator, the combination of a reversible frame, a locking member coöperating with the frame to hold the same in either position, a double reel and web mounted in the frame, means to take up the web in either position of the frame, a pair of opposite tripping levers mounted on the frame and projecting respectively into position to engage and release the locking member to permit the frame to be reversed, and means located at predetermined points on the web to operate the respective tripping levers, to release the lock.

8. In a street or station indicator, the combination of a revoluble frame, double reels and a web mounted in the frame, a clutch member carried by the frame at the axis thereof, a locking device coöperating with the frame to prevent turning thereof, a take up mechanism operatively connected to the web and including a clutch member engageable with the said clutch member to turn the frame, means to normally prevent engagement of said clutch members, including a tripping device also operatively connected to the locking device, and means carried by the web, at a predetermined point thereof, to operate the tripping device to release the lock and permit engagement of the clutch members.

9. In a street or station indicator, the combination of reels and web, a web feeding shaft having devices thereon engaging the web, a ratchet geared to the shaft, a swinging member carrying a pawl engaging the ratchet, a dog for locking the ratchet, a locking device yieldingly engaging the dog with the ratchet, said device being located in the line of movement of the swinging member to be struck and released thereby, and means to swing said member when desired.

10. In a street or station indicator, the combination of a revoluble frame, reels mounted in the frame on opposite sides of its axis, feed shafts mounted in the frame also on opposite sides of its axis, pin sprockets loose on the feed shafts, clutch members mounted on the shafts and engaging said sprockets, a web extending around the reels and sprockets and engaged by the pins on the latter, a take up mechanism engageable with either shaft by a partial revolution of the frame, and means to disengage the clutch members from the sprockets on the shaft not engaged by the take up mechanism.

11. In a street or station indicator, the combination of reels and a web connected thereto, take up mechanism operatively connected to the web, said mechanism including an operating lever and a lock released by movement thereof, and hand-setting devices independent of said lever and engageable with said mechanism and lock to operate the web and release the lock.

In testimony whereof I affix my signature, in presence of two witnesses.

PERRY T. SPINDLER.

Witnesses:
FLORIUN WILLIAM SCHMIDT,
NELLIE FELTSKOG.

---

Copies of this patent may be obtained for five cents each, by addressing the "Commissioner of Patents, Washington, D. C."